United States Patent
Ibaraki

Patent Number: 5,942,879
Date of Patent: Aug. 24, 1999

[54] CONTROL SYSTEM FOR HYBRID VEHICLES

[75] Inventor: Shigeru Ibaraki, Wako, Japan

[73] Assignee: Honda Giken Kogyo Kabushiki Kaisha, Tokyo, Japan

[21] Appl. No.: 08/855,249

[22] Filed: May 13, 1997

[30] Foreign Application Priority Data

May 22, 1996 [JP] Japan .................... 8-149727

[51] Int. Cl.⁶ .............. H02P 9/04; F02N 11/06; B60K 1/00
[52] U.S. Cl. .............. 322/16; 290/406; 180/65.2; 180/65.4
[58] Field of Search .............. 322/16; 290/406; 180/65.2, 65.4

[56] References Cited

U.S. PATENT DOCUMENTS

| | | | |
|---|---|---|---|
| 3,923,115 | 12/1975 | Helling | 180/65.2 |
| 4,165,795 | 8/1979 | Lynch et al. | 318/139 |
| 4,305,254 | 12/1981 | Kawakatsu et al. | 60/716 |
| 4,407,132 | 10/1983 | Kawakatsu et al. | 60/716 |
| 5,287,772 | 2/1994 | Aoki et al. | 74/846 |
| 5,327,992 | 7/1994 | Boll | 180/65.2 |
| 5,637,987 | 6/1997 | Fattic et al. | 322/40 |
| 5,720,690 | 2/1998 | Hara et al. | 477/20 |
| 5,771,478 | 6/1998 | Tsukamoto et al. | 701/68 |
| 5,789,882 | 8/1998 | Ibaraki et al. | 318/148 |
| 5,806,617 | 9/1998 | Yamaguchi | 180/65.2 |

FOREIGN PATENT DOCUMENTS

| | | |
|---|---|---|
| 0 710 787 A2 | 5/1996 | European Pat. Off. . |
| 5-229351 | 9/1993 | Japan . |
| 7-150375 | 6/1995 | Japan . |
| 7-150376 | 6/1995 | Japan . |

Primary Examiner—Thomas M. Dougherty
Assistant Examiner—Peter Medley
Attorney, Agent, or Firm—Frishauf, Holtz, Goodman, Langer & Chick, P.C.

[57] ABSTRACT

A control system for a hybrid vehicle including a traction motor which drives a drive shaft of the vehicle by electrical energy and has a regenerative function of converting kinetic energy of the drive shaft into electrical energy, a transmission arranged between driving wheels of the vehicle and an internal combustion engine of the vehicle and the traction motor, and a storage battery which supplies electrical energy to the traction motor and stores electrical energy output from the traction motor. A desired output from the traction motor is calculated according to decelerating conditions of the vehicle, and an optimal rotational speed of the traction motor at which the traction motor provides a maximum regeneration output is calculated according to the calculated desired output. The change gear ratio of the transmission is controlled such that the rotational speed of the traction motor is equal to the optimal rotational speed.

15 Claims, 14 Drawing Sheets

CONTROL SYSTEM FOR HYBRID VEHICLES

BACKGROUND OF THE INVENTION

1. Field of the Invention

This invention relates to a control system for hybrid vehicles having an internal combustion engine and a traction motor as prime movers.

2. Prior Art

Conventionally, a hybrid vehicle having an internal combustion engine (hereinafter simply referred to as "the engine") and a traction motor as prime movers is widely known, and a control system for controlling the prime movers of such a hybrid vehicle has already been proposed, e.g. by Japanese Laid-Open Patent Publication (Kokai) No. 5-229351.

The proposed control system determines the optimum torque at which the maximum engine efficiency is attained, in dependence on traveling conditions of the vehicle, and at the same time detects actual torque generated by the engine for actually driving the vehicle. Then, the control system determines or selects demanded or required torque from the optimum torque and the actual torque. When the optimum torque is selected as the demanded torque, and at the same time, the optimum torque is larger than the actual torque, regenerative current is caused to be generated for regeneration of energy (specifically, electrical energy).

When the regeneration of energy is carried out by the traction motor, generally the amount of regenerative energy becomes larger with an increase in the rotational speed of the traction motor. On the other hand, as the rotational speed of the motor, i.e. the rotational speed of the engine increases, the loss of energy due to engine braking increases. In addition, the traction motor has a limited capacity with respects to generating electric power, and accordingly it cannot regenerate electrical energy beyond the limit in spite of its increased motor rotational speed.

The conventional control system, however, does not contemplate the relationship between the motor rotational speed, engine braking, and the generating capacity of the motor, and therefore still remains to be improved in terms of efficient collection of kinetic energy of the vehicle as electrical energy.

SUMMARY OF THE INVENTION

It is an object of the invention to provide a control system for a hybrid vehicle having an internal combustion engine, a traction motor, and a transmission arranged between the engine and motor and driving wheels of the vehicle, which is capable of controlling the change gear ratio of the transmission in a manner so as to improve the efficiency of regeneration of electrical energy by the traction motor and hence achieve the maximum efficiency of collection of kinetic energy of the vehicle during deceleration.

To attain the above object, the present invention provides a control system for a hybrid vehicle including driving wheels, an internal combustion engine, a drive shaft driven by the engine, a traction motor for driving the drive shaft by electrical energy and having a regenerative function of converting kinetic energy of the drive shaft into electrical energy, a transmission arranged between the driving wheels of the vehicle and the engine and the traction motor, and electrical storage means for supplying electrical energy to the traction motor and for storing electrical energy output from the traction motor, the control system comprising:

desired output-calculating means for calculating a desired output from the traction motor according to decelerating conditions of the vehicle;

optimal rotational speed-calculating means for calculating an optimal rotational speed of the traction motor at which the traction motor provides a maximum regeneration output, according to the desired output calculated by the desired output-calculating means; and change gear ratio control means for controlling a change gear ratio of the transmission such that a rotational speed of the traction motor is equal to the optimal rotational speed.

As a result, kinetic energy generated during deceleration of the vehicle can be efficiently collected as electrical energy.

Preferably, the optimal rotational speed-calculating means calculates the optimal rotational speed based on a regeneration output limit of the traction motor.

As a result, excessive heating of the traction motor and an extra change in the change gear ratio can be avoided.

More preferably, the desired output-calculating means includes engine demanded output-calculating means for calculating an output demanded by the engine, based on operating conditions of the engine including rotational speed of the engine, running resistance-calculating means for calculating a running resistance of the vehicle, based on running conditions of the vehicle, and engine extra output-calculating means for calculating an extra output of the engine, based on the output demanded by the engine and the running resistance, the desired output-calculating means calculating the desired output of the traction motor, based on the extra output of the engine.

Further preferably, the optimal rotational speed-calculating means calculates the regeneration output limit of the traction motor according to the rotational speed of the engine, and calculates the optimal rotational speed of the traction motor, based on the desired output of the traction motor and the regeneration output limit.

Preferably, the regeneration output limit is set so as to increase in proportion to the rotational speed of the engine in a region where the rotational speed of the engine is lower than a predetermined value, and set to a fixed value in a region where the rotational speed of the engine is equal to or higher than the predetermined value.

Also preferably, the change gear ratio control means controls the change gear ratio of the transmission in response to a difference between the rotational speed of the engine and the optimal rotational speed such that the difference is minimized.

Preferably, the vehicle includes an accelerator pedal, the transmission including a driven shaft, the change gear ratio control means including means for calculating a basic change gear ratio of the transmission, based on a stepping-on amount of the accelerator pedal and traveling speed of the vehicle, the change gear ratio control means calculating a desired change gear ratio, based on the difference between the rotational speed of the engine and the optimal rotational speed, rotational speed of the driven shaft, and the basic change gear ratio calculated by the means, the change gear ratio control means controlling the change gear ratio to the calculated desired change gear ratio.

Preferably, the control system includes remaining charge-calculating means for calculating an amount of remaining charge in the electrical storage means, and motor output-limiting means for limiting an output from the traction motor, based on the amount of remaining charge calculated by the remaining charge-calculating means.

As a result, the electrical storage means can be recharged in a suitable manner according to the remaining charge amount.

Advantageously, the transmission is a variable speed transmission.

As a result, the most efficient collection of kinetic energy of the vehicle during deceleration can be achieved.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
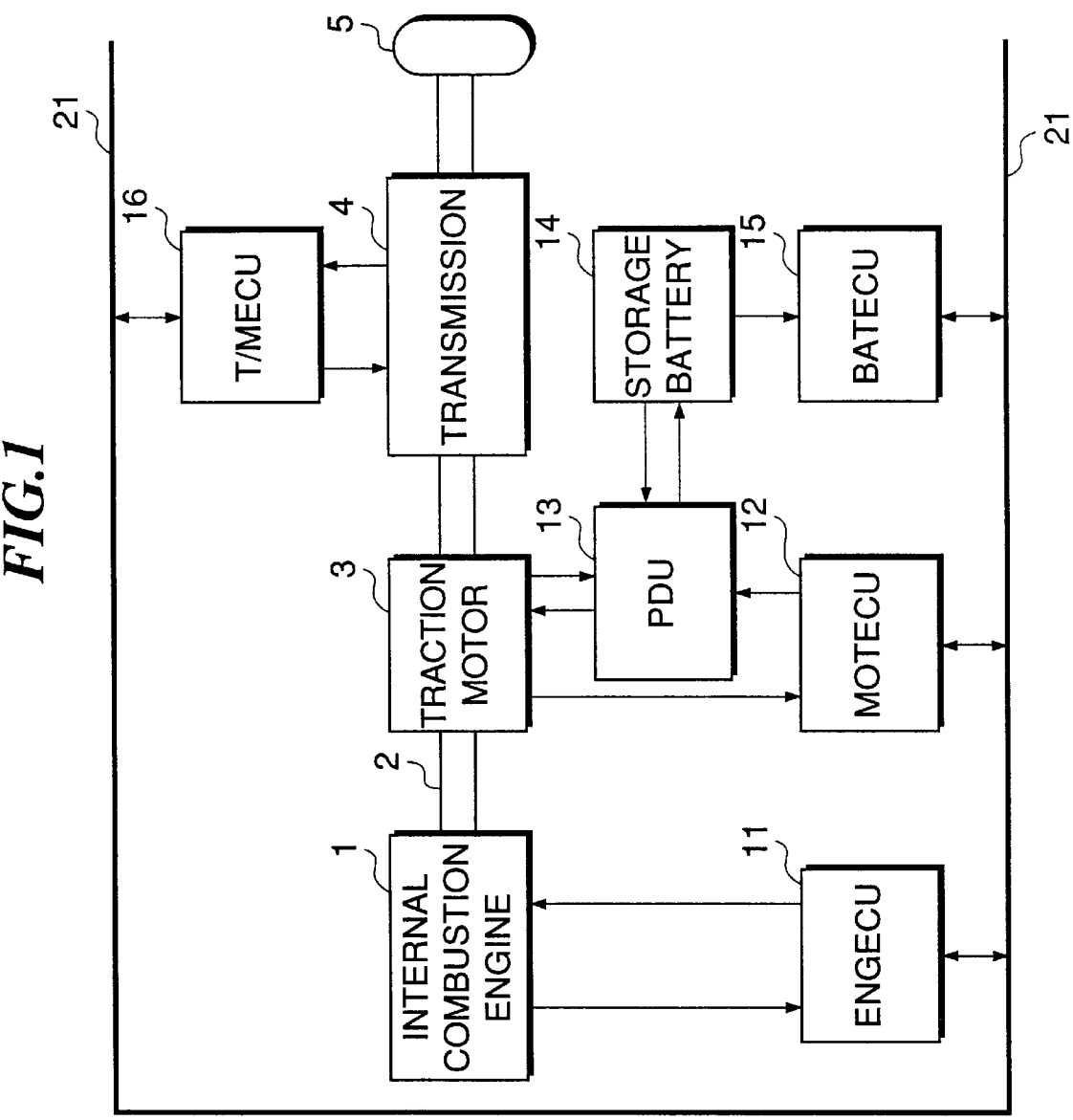
FIG. 1 is a block diagram schematically showing the whole arrangement of a drive system of a hybrid vehicle, and a control system therefor, according to an embodiment of the invention.

Referring first to FIG. 1, there is schematically shown the arrangement of a drive system for a hybrid vehicle, and a control system therefor (sensors, actuators, and other components associated therewith are omitted), according to an embodiment of the invention.

As shown in the figure, an internal combustion engine (hereinafter simply referred to as "the engine") 1 rotatively drives a drive shaft 2 to transmit torque via a transmission 4 to driving wheels 5 to rotatively drive the same. A traction motor 3 is arranged on the drive shaft 2 such that the former can directly drive the latter for rotation. The traction motor 3 serves not only as a prime mover for assisting the engine 1 but also as a generator for performing a regenerative function of converting part of the vehicle's kinetic energy transmitted from the rotating drive shaft 2 into electrical energy, and outputting the electrical energy to recharge a storage battery 14 electrically connected thereto via a power drive unit (hereinafter referred to as "the PDU") 13. The traction motor 3 has its operation controlled by a control signal received via the PDU 13.

The control system includes an electronic control unit (hereinafter referred to as "ENGECU") 11 for controlling the engine 1, an electronic control unit (hereinafter referred to as "MOTECU") 12 for controlling the traction motor 3, an electronic control unit (hereinafter referred to as "BATECU") 15 for controlling the storage battery 14, and an electronic control unit (hereinafter referred to as "T/MECU") 16 for controlling the transmission 4. These ECU's are connected to each other via a data bus 21, and transmit data of detected parameters, information on flags, etc. to each other.

Figure 2:
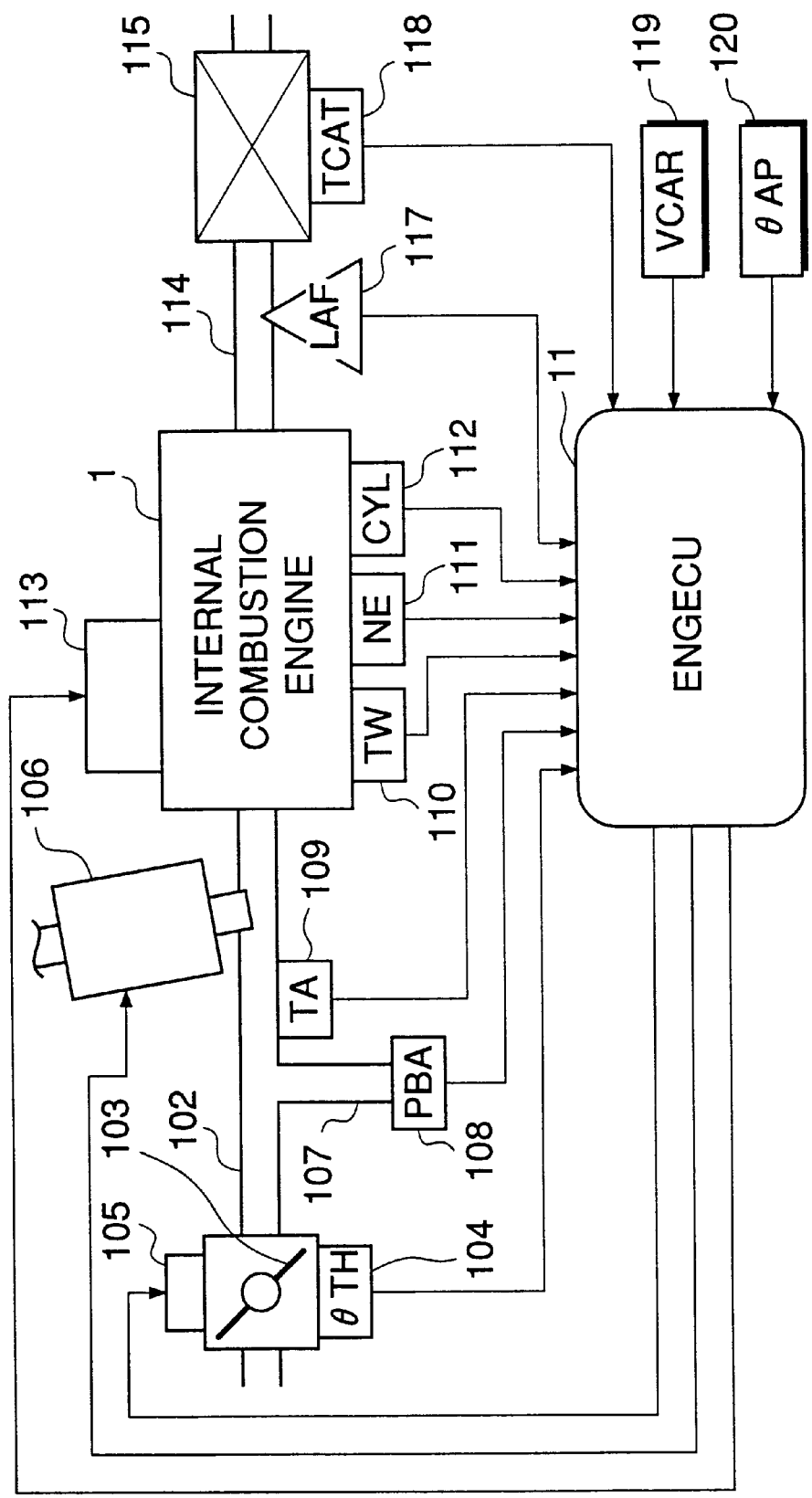
FIG. 2 is a block diagram schematically showing the arrangement of an internal combustion engine and a control system therefor.

FIG. 2 shows the arrangement of the engine 1, the ENGECU 11, and peripheral devices associated therewith. Connected to the cylinder block of the engine is an intake pipe 102 in which is arranged a throttle valve 103. A throttle valve opening (θTH) sensor 104 is connected to the throttle valve 103, for generating an electric signal indicative of the sensed throttle valve opening θTH and supplying the same to the ENGECU 11. The throttle valve 103 is a so-called drive-by-wire type (DBW) and connected to a throttle actuator 105 to have the valve opening θTH thereof electrically controlled thereby. The throttle actuator 105 has its operation controlled by a signal from the ENGECU 11.

Fuel injection valves 106, only one of which is shown, are inserted into the intake pipe 102 at locations intermediate between the cylinder block of the engine 1 and the throttle valve 103 and slightly upstream of respective corresponding intake valves, not shown. The fuel injection valves 106 are connected to a fuel pump via a pressure regulator, neither of which is shown, and electrically connected to the ENGECU 11 to have their valve opening periods and valve opening timing controlled by signals therefrom.

On the other hand, an intake pipe absolute pressure (PBA) sensor 108 is provided in communication with the interior of the intake pipe 102 via a conduit 107 at a location immediately downstream of the throttle valve 103, for supplying an electric signal indicative of the sensed absolute pressure PEA within the intake pipe 102 to the ENGECU 11.

An intake air temperature (TA) sensor 109 is inserted into the intake pipe 102 at a location downstream of the conduit 107, for supplying an electric signal indicative of the sensed intake air temperature TA to the ENGECU 11. An engine coolant temperature (TW) sensor 110, which may be formed of a thermistor or the like, is mounted in the cylinder block of the engine 1, for supplying an electric signal indicative of the sensed engine coolant temperature TW to the ENGECU 11.

An engine rotational speed (NE) sensor 111 is arranged in facing relation to a camshaft or a crankshaft of the engine 1, neither of which is shown. The engine rotational speed (NE) sensor 111 generates a pulse (hereinafter referred to as "the TDC signal pulse") at a predetermined crank angle position of each cylinder at a predetermined angle before a TDC position of the cylinder corresponding to the start of the intake stroke thereof whenever the crankshaft rotates through 180 degrees. The TDC signal pulse is supplied to the ENGECU 11.

The engine 1 has spark plugs 113 respectively provided for the cylinders. Each spark plug 113b connected to the ENGECU 11 to have its ignition timing controlled by a signal therefrom.

A three-way catalyst 115 is arranged within an exhaust pipe 114 connected to the cylinder block of the engine 1, for purifying noxious components such as HC, CO, and NOx. A linear output type air-fuel ratio sensor (hereinafter referred to as "the LAF sensor") 117 is arranged in the exhaust pipe 114 at a location upstream of the three-way catalyst 115. The LAF sensor 117 supplies an electric signal which is substantially proportional to the concentration of oxygen present in exhaust gases to the ENGECU 11. The LAF sensor 117 is capable of detecting the air-fuel ratio of a mixture supplied to the engine 1 over a wide range from a leaner side to a richer side.

The three-way catalyst 115 has a catalyst temperature (TCAT) sensor 118 provided therefor, of which an output signal indicative of the sensed catalyst temperature TCAT is supplied to the ENGECU 11. Further, a vehicle speed sensor 119 for detecting a vehicle speed VCAR at which the vehicle is traveling and an accelerator opening sensor 120 for detecting an accelerator pedal travel exerted by the driver (hereinafter referred to as "accelerator opening") θAP are connected to the ENGECU 11, and signals indicative of the sensed vehicle speed VCAR and the sensed accelerator opening θAP are supplied to the ENGECU 11.

The ENGECU 11 is comprised of an input circuit, not shown, which has the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), not shown, a memory device, not shown, which stores various operational programs which are executed by the CPU, and results of calculations therefrom, etc., and an output circuit, not shown, which outputs driving signals to the fuel injection valves 106, the spark plugs 113, etc. The construction of each of the other ECU's is basically similar to that of the ENGECU 11.

Figure 3:
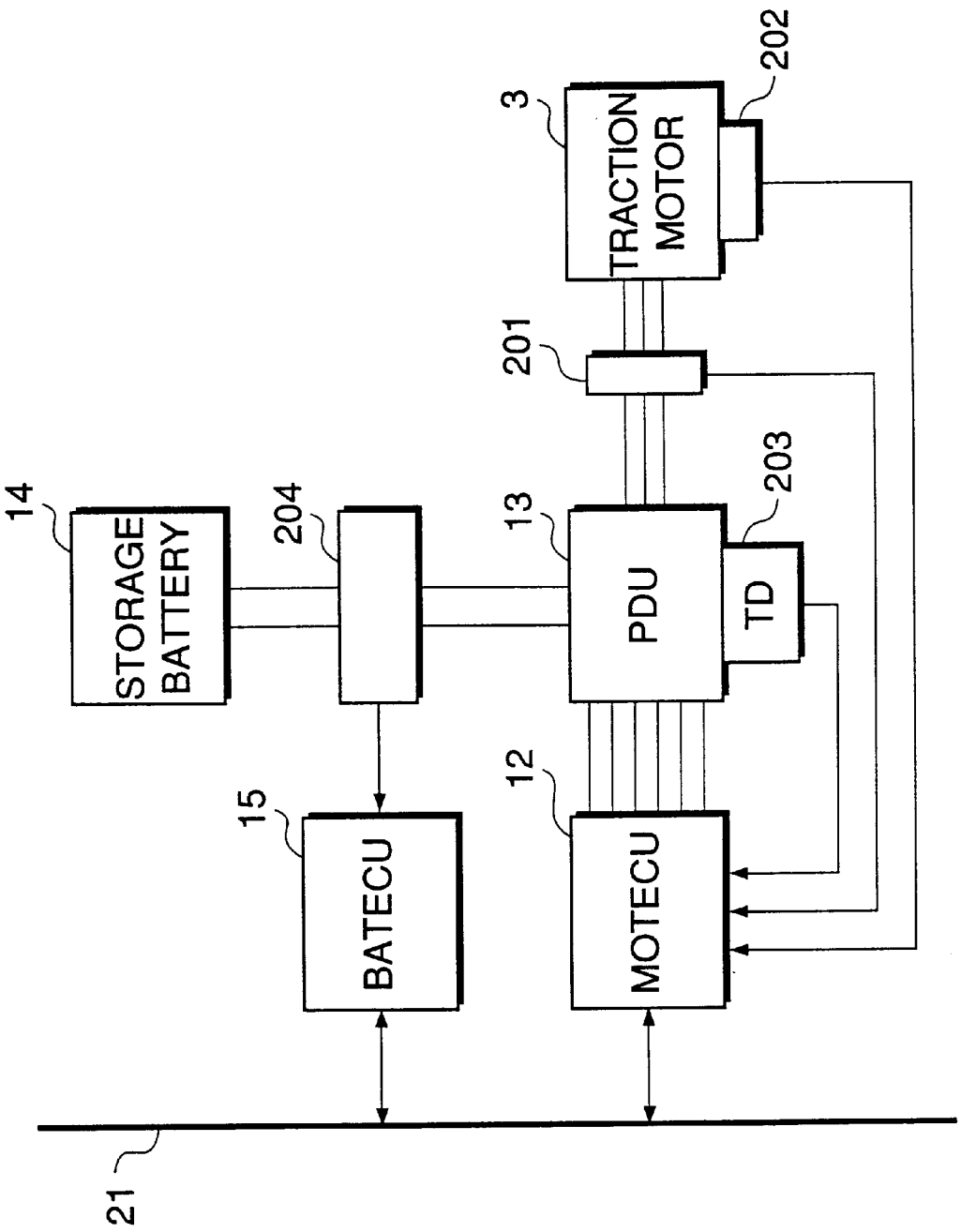
FIG. 3 is a block diagram schematically showing the arrangement of a traction motor and a control system therefor.

FIG. 3 shows details of the connection of the traction motor 3, the PDU 13, the storage battery 14, the MOTECU 12, and the BATECU 15.

The traction motor 3 has a motor rotational speed sensor 202 arranged thereon for detecting the rotational speed of the traction motor 3, of which an output signal indicative of the sensed motor rotational speed is supplied to the MOTECU 12. Arranged on lines electrically connecting between the PDU 13 and the traction motor 3 is a current/voltage sensor 201 for detecting voltage and current of electricity supplied to or generated from the traction motor 3. Further, the PDU 13 has a temperature sensor 203 arranged thereon for detecting the temperature TD of a protective resistance of a drive circuit, not shown, of the traction motor 3. These sensors 201, 203 supply signals indicative of the respective detected parameters to the MOTECU 12.

Arranged on lines electrically connecting between the storage battery 14 and the PDU 13 is a voltage/current sensor 204 for detecting voltage across output terminals of the storage battery 14 and electric current flowing from or into the storage battery 14, of which output signals indicative of the sensed voltage and the sensed electric current are supplied to the BATECU 15.

Figure 4:
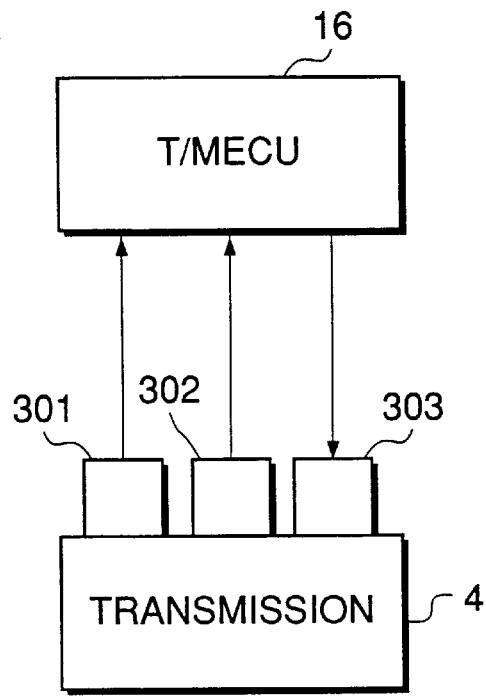
FIG. 4 is a block diagram schematically showing the arrangement of a transmission and a control system therefor.

FIG. 4 shows the connection between the transmission 4 and the T/MECU 16. The transmission 4 is a variable speed transmission, and has rotational speed sensors 301 and 302 arranged thereon for detecting the rotational speed ND of a driving shaft of the transmission 4 and the rotational speed NM of a driven shaft of the same, respectively, of which signals indicative of the sensed parameters are supplied to the T/MECU 16. The T/MECU 16 calculates a change gear ratio GR, based on the output signals from the sensors 301 and 302. Further, the transmission 4 has a transmission actuator 303 arranged thereon to have its operation controlled via the transmission actuator 303 by a signal from the T/MECU 16.

Figure 5:
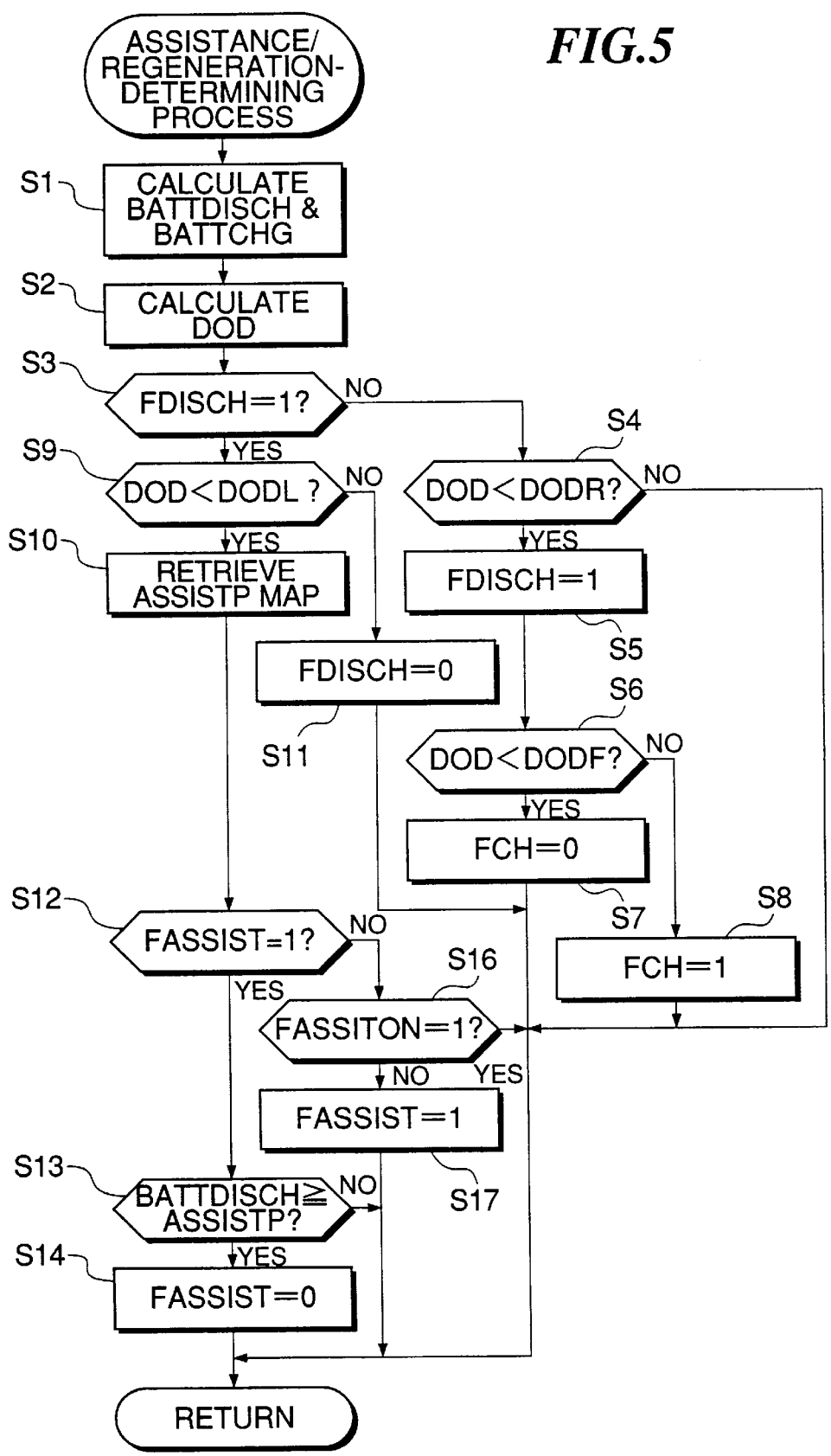
FIG. 5 is a flowchart showing a program for carrying out an assistance/regeneration-determining process in which whether the assistance of the traction motor to the engine or the regeneration of electrical energy by the traction motor should be carried out is determined based on the amount of remaining charge in a storage battery.

FIG. 5 shows a program for carrying out an assistance/regeneration-determining process, which is executed by the BATECU 15 at for example, predetermined time intervals.

First, at a step S1, a cumulative discharge value BATT-DISCH and a cumulative charge value BATTCHG are calculated. More specifically, output current from the storage battery 14 and input current (charging current) flowing into the same are detected by the current/voltage sensor 204, and a cumulative value of the former (BATTDISCH) and a cumulative value of the latter (BATTCHG) are calculated whenever the present process is carried out. In the present embodiment, the cumulative discharge value BATTDISCH assumes a positive value while the cumulative charge value BATTCHG assumes a negative value. Further, the cumulative discharge value BATTDISCH is reset when the assistance of the traction motor 3 to the engine 1 is started (at a step S49 in FIG. 11A), while the cumulative charge value BATTCHG is reset when the regeneration of electrical energy by the traction motor 3 is started (at a step S73 in FIG. 11B).

At the following step S2, a depth of discharge DOD of the storage battery 14 is calculated. More specifically, provided that BATTFULL represents the capacity of the storage battery 14, i.e. an amount of electric charge which the storage battery 14 can discharge when it is in its fully-charged state, the depth of discharge DOD can be calculated by the use of the following equation (1):

$$DOD=(BATTDISCH+BATTCHG)/BATTFULL \qquad (1)$$

Accordingly, a remaining charge BATTREM in the storage battery 14 can be calculated by an equation of BATTREM=BATTFULL−(BATTDISCH+BATTCHG), and a remaining charge ratio RREM by an equation of RREM= BATTREM/BATTFULL=1−DOD.

At a step S3, it is determined whether or not a discharge-permitting flag FDISCH, which, when set to "1", indicates that discharging of the storage battery 14 is permitted, assumes "1". If FDISCH=1 holds, it is determined at a step S9 whether or not the depth of discharge DOD is smaller than a predetermined reference value DODL which corresponds to a lower limit of the amount of electric charge stored in the storage battery 14. If DOD≧DODL holds, which means that the remaining charge BATTREM in the storage battery 14 is small, the discharge-permitting flag FDISCH is set to "0" at a step S11 to thereby inhibit discharging of the storage battery 14, followed by terminating the program.

Figure 6:
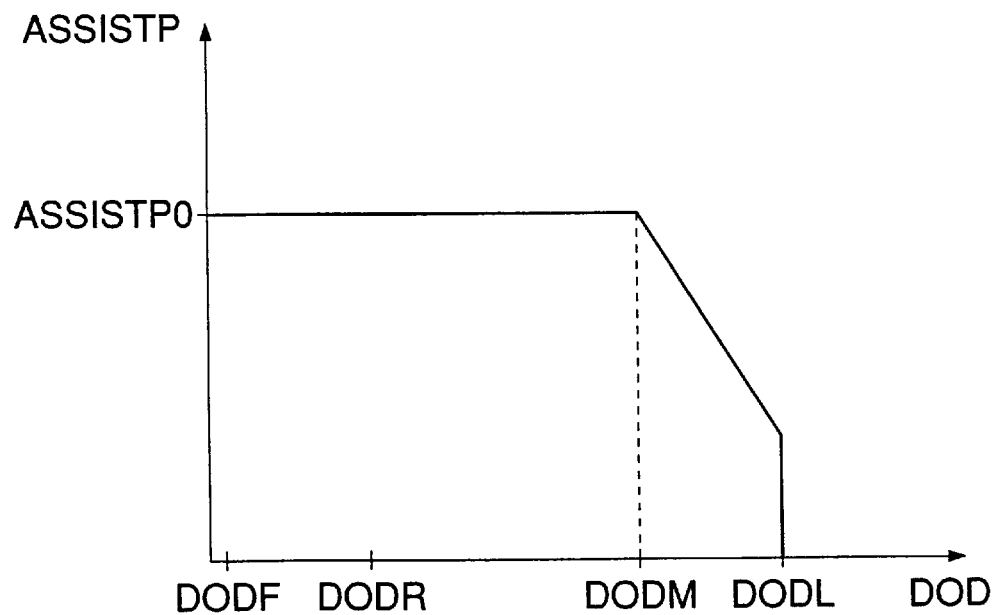
FIG. 6 shows an ASSISTP map for use in the FIG. 5 process.

If DOD<DODL holds at the step S9, an ASSISTP map is retrieved according to the depth of discharge DOD at a step S10 to determine an allowable amount of discharge ASSISTP. The ASSISTP map is set, e.g. as shown in FIG. 6, such that until the depth of discharge DOD reaches a predetermined reference value DODM corresponding to a medium amount of charge in the storage battery 14, the allowable amount of discharge ASSISTP is set to a predetermined fixed value ASSISTP0, and when the depth of discharge DOD is within a range of the predetermined reference value DODM to the predetermined reference value DODL, the ASSISTP value is set to a smaller value as the depth of discharge DOD increases.

At the following step S12, it is determined whether or not an assistance-permitting flag FASSIST, which, when set to 1, indicates that the traction motor 3 is permitted to assist the engine 1 in providing torque to the driving wheels 5, assumes "1". If FASSIST=1 holds, it is determined at a step S13 whether or not the cumulative discharge value BATTDISCH is equal to or larger than the allowable amount of discharge ASSISTP. If BATTDISCH<ASSISTP holds, the program is immediately terminated, i.e. the assistance of the traction motor 3 to the engine 1 continues to be permitted, whereas if BATTDISCH≧ASSISTP holds, the assistance-permitting flag FASSIST is set to "0" at a step S14 to thereby inhibit the assistance of the traction motor 3, followed by terminating the program.

The steps S13 and S14 make it possible to prevent the storage battery 14 from being excessively discharged, since the assistance of the traction motor 3 is inhibited when the cumulative discharge value BATTDISCH is equal to or larger than the allowable amount of discharge ASSISTP.

On the other hand, if FASSIST=0 holds at the step S12, which means that the assistance of the traction motor 3 is not permitted, it is determined at a step S16 whether or not an assistance-executing flag FASSISTON, which, when set to 1, indicates that the assistance of the traction motor 1 is being executed, assumes "1". If FASSISTON=1 holds, the program is immediately terminated, whereas if FASSISTON=0 holds, the assistance-permitting flag FASSIST is set to "1" at a step S17, followed by terminating the program.

If FDISCH=0 holds at the step S3, which means that discharging of the storage battery 14 is not permitted, it is determined at a step S4 whether or not the depth of discharge DOD is smaller than a predetermined reference value DODR at or below which a dischargeable state of the storage battery 14 is permitted to be restored (see FIG. 6). If DOD≧DODR holds, the program is immediately terminated to continue inhibition of discharging of the storage battery 14, whereas if DOD<DODR holds by virtue of regeneration, the discharge-permitting flag FDISCH is set to "1" at a step S5, and further it is determined at a step S6 whether or not the depth of discharge DOD is smaller than a predetermined reference value DODF indicative of a substantially fully-charged state of the storage battery 14 (see FIG. 6). If DOD≧DODF holds, which means that the storage battery 14 is not fully charged, a charge-permitting flag FCH is set to "1" at a step S8, thereby permitting charging or recharging of the storage battery 14. On the other hand, if DOD<DODF holds, which means that the storage battery 14 is substantially fully charged, the charge-permitting flag FCH is set to "0" at a step S7, thereby inhibiting charging of the storage battery 14, followed by terminating the program.

Figure 7:
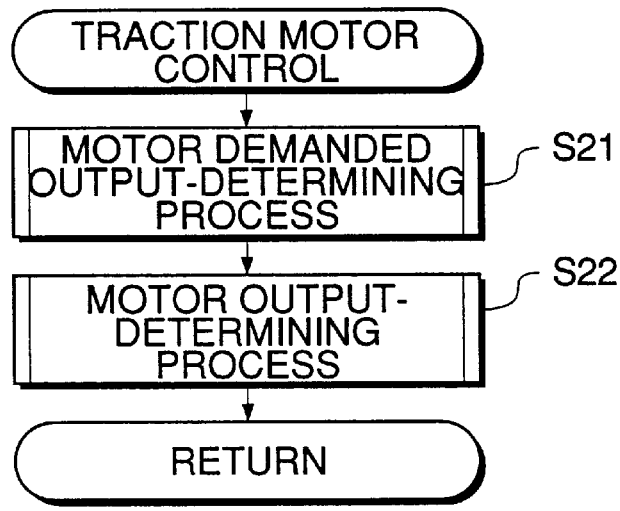
FIG. 7 is a flowchart showing a program for carrying out overall traction motor control.

FIG. 7 shows a program for carrying out a traction motor control process, which is executed by the MOTECU 12 at predetermined time intervals. This program comprises two steps: a step S21 for executing a motor demanded output-determining process (subroutine shown in FIG. 8), and a step S22 for executing a motor output-determining process (subroutine shown in FIGS. 11A and 11B).

Figure 8:
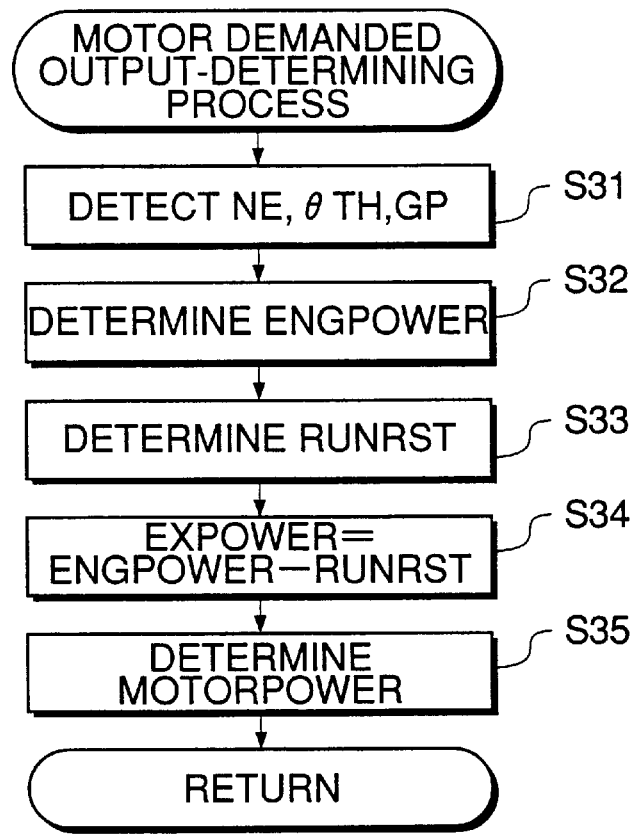
FIG. 8 is a flowchart showing a routine for carrying out a motor demanded output-determining process.

Referring to the FIG. 8 subroutine for the motor demanded output-determining process, first, at a step S31, the engine rotational speed NE and the throttle valve opening θTH (or alternatively the accelerator opening θAP) are detected. Then, an ENGPOWER map is retrieved according to detected values of these parameters to determine an engine demanded output ENGPOWER, i.e. an engine output demanded by the driver of the vehicle, at a step S32.

Figure 9:
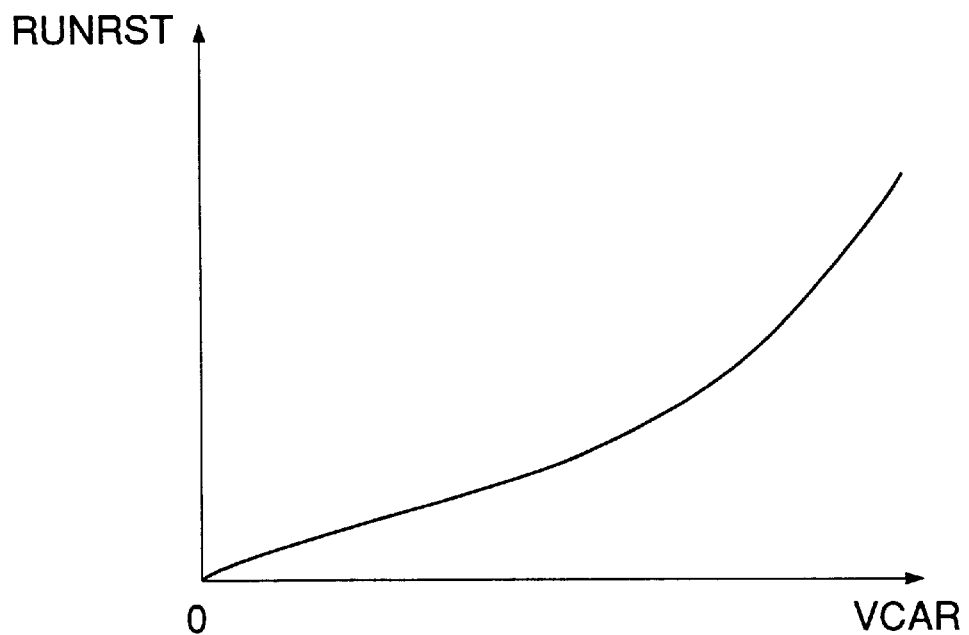
FIG. 9 shows a RUNRST table for determining running resistance of the vehicle.

At the following step S33, a RUNRST table is retrieved according to the vehicle speed VCAR to determine a running resistance RUNRST of the vehicle, i.e. a resistance which the vehicle receives when it travels. The RUNRST table is set, e.g. as shown in FIG. 9, such that as the vehicle speed VCAR increases, the running resistance RUNRST assumes a higher value. Then, at a step S34, an extra output EXPOWER is calculated by subtracting the running resistance RUNRST from the engine demanded output ENGPOWER. In the above determinations and calculation, the engine demanded output ENGPOWER and the running resistance RUNRST are both measured in watts (W).

Figure 10:
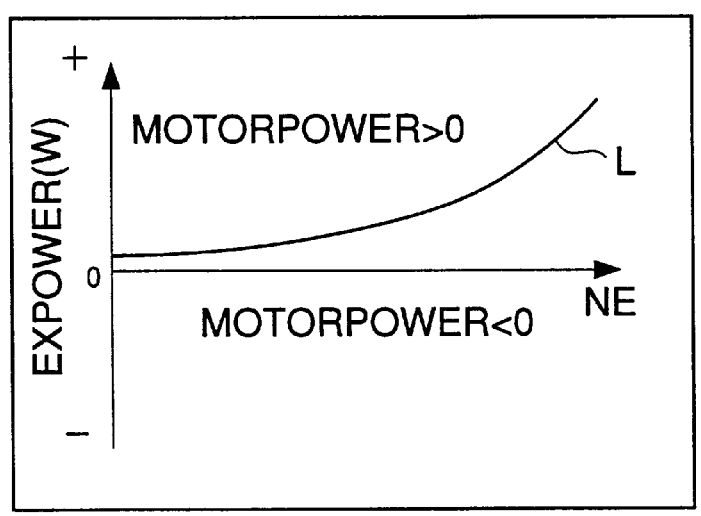
FIG. 10 shows a MORTORPOWER map for determining motor demanded output.

At the following step S35, a MOTORPOWER map is retrieved according to the engine rotational speed NE, and the extra output EXPOWER to determine a motor demanded output MOTORPOWER. In an area above a curve L in the map, as viewed in FIG. 10, i.e. in an operating region in which the extra output EXPOWER is large, the motor demanded output MOTORPOWER is set to a positive value (MOTORPOWER>0), thereby permitting the assistance of the traction motor 3. On the other hand, in an area below the curve L as viewed in FIG. 10, i.e. in an operating region in which the extra output EXPOWER assumes a small positive value or a negative value, the motor demanded output MOTORPOWER is set to a negative value (MOTORPOWER<0), thereby permitting regeneration of electrical energy by the traction motor 3. As shown in FIG. 10, the curve L progressively rises with an increase in the engine rotational speed NE, which means that as the engine rotational speed NE is higher, the motor demanded output MOTORPOWER is set to a positive value relative to a larger value of the extra output EXPOWER, i.e. the assistance of the traction motor 3 is permitted.

As described above, according to the FIG. 8 process, the extra output EXPOWER of the engine is calculated by subtracting the running resistance RUNRST from the engine demanded output ENGPOWER, and the motor demanded output MOTORPOWER is determined according to the extra output EXPOWER and the engine rotational speed NE.

Figure 11A:
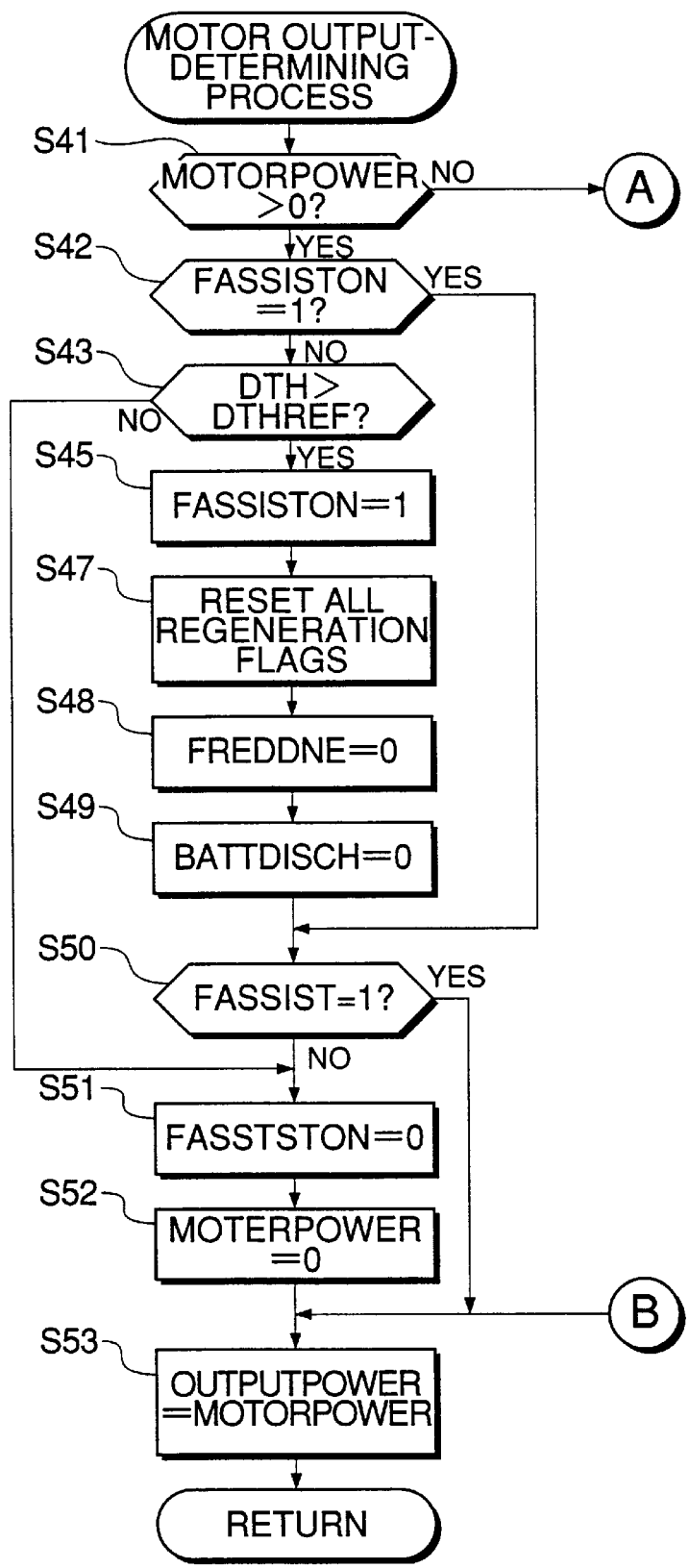
FIG. 11A is a flowchart showing a routine for carrying out a motor output-determining process.
Figure 11B:
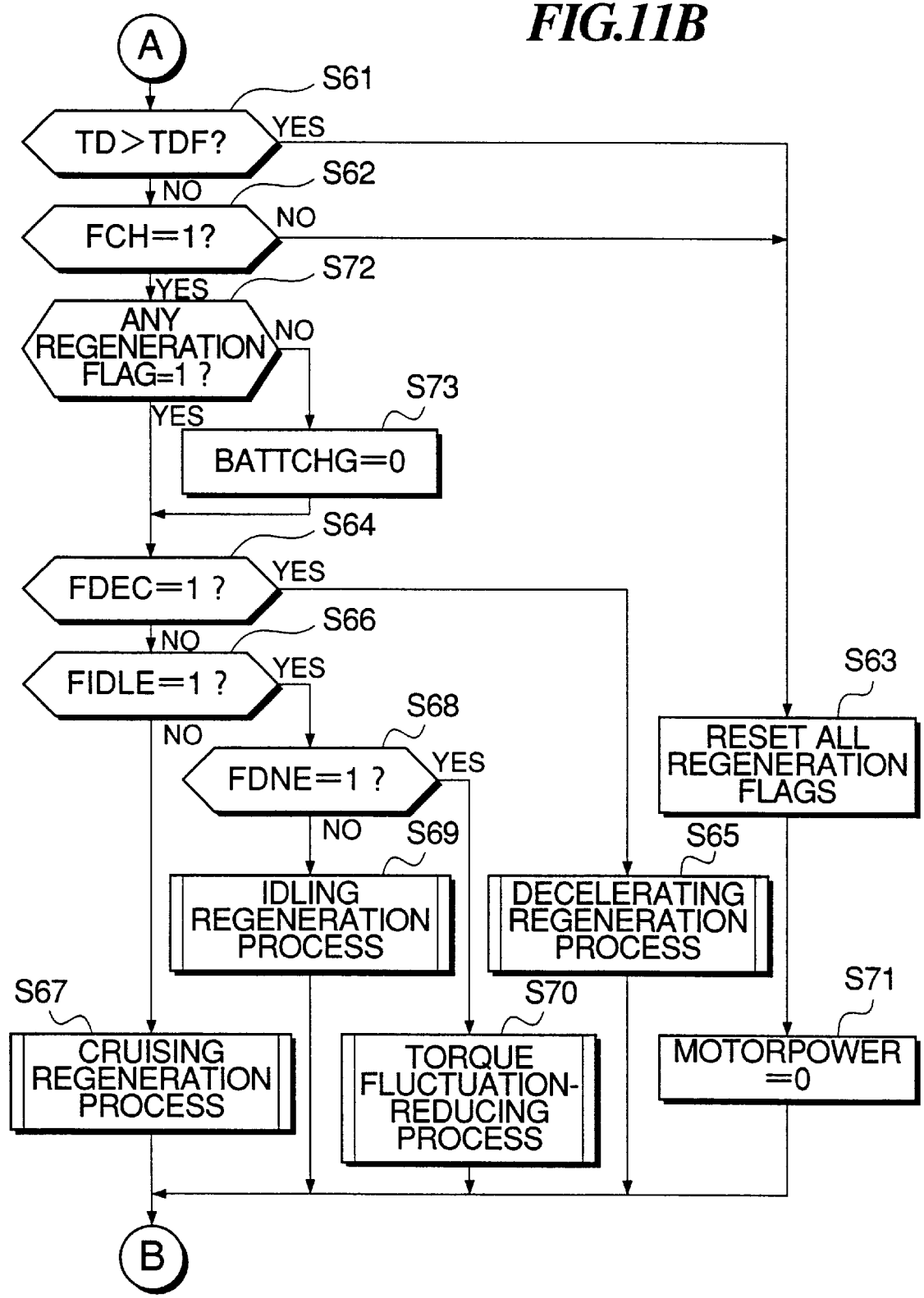
FIG. 11B is a continued part of the FIG. 11A flowchart.

FIGS. 11A and 11B show details of the subroutine for the motor output-determining process which is executed at the step S22 in FIG. 7.

First, at a step S41, it is determined whether or not the motor demanded output MOTORPOWER is larger than "0". If MOTORPOWER>0 holds, it is determined at a step S42 whether or not the assistance-executing flag FASSISTON assumes "1". If FASSISTON=1 holds, which means that the assistance of the traction motor 3 to the engine 1 is being executed, the program jumps to a step S50, whereas if FASSISTON=0 holds, which means that the assistance of the traction motor 3 is not being executed, it is determined at a step S43 whether or not an amount of change DTH in the throttle valve opening θTH detected is larger than a predetermined value DTHREF (>0).

If DTH≦DTHREF holds, the program jumps to a step S51, whereas if DTH>DTHREF holds, which means that acceleration of the engine 1 is being demanded, the assistance-executing flag FASSISTON is set to "1" at a step S45, and then the program proceeds to a step S47.

At the step S47, all kinds of regeneration flags (which are set to "1" when the regeneration of electrical energy by the traction motor 3 is executed), i.e. a cruising regeneration flag FCRUREG, an idling regeneration flag FIDLEREG, and a decelerating regeneration flag FDREG, are set to "0". Then, a fluctuation-reducing flag FREDDNE, which, when set to "1", indicates that a torque fluctuation-reducing process (step S70 in FIG. 12) is being executed, is set to "0" at a step S48, and the cumulative discharge value BATTDISCH is reset to "0" at the step S49, followed by the program proceeding to the step S50.

At the step S50, it is determined whether or not the assistance-permitting flag FASSIST assumes "1". If FASSIST=1 holds, the program jumps to a step S53, whereas if FASSIST=0 holds, the program proceeds to the step S51.

At the step S51, the assistance-executing flag FASSISTON is set to "0", and the motor demanded output MOTORPOWER is set to "0" at a step S52. Then, the program proceeds to the step S53, wherein the motor output OUTPUTPOWER is set to the motor demanded output MOTORPOWER, followed by terminating the program.

According to the above steps S42 to S52, so long as the motor demanded output MOTORPOWER>0 holds, the drive system of the hybrid vehicle is controlled in the following manner:

1) Even if MOTORPOWER>0 holds, the assistance of the traction motor 3 to the engine 1 is not executed unless the acceleration of the engine is demanded (steps S43, S51, and S52); and 2) When the acceleration of the engine is demanded, if leaning operation of the engine 1 and assistance of the traction motor 3 to the engine 1 are permitted, the drive system of the hybrid vehicle is operated with the assistance of the traction motor 3 to the engine 1 such that the air-fuel ratio of the mixture supplied to the engine 1 is controlled to a fixed lean value or a lean value dependent on the amount of assistance of the traction motor 3 to the engine 1, whereas if the leaning operation of the engine 1 and assistance of the traction motor 3 to the engine 1 are not permitted, the drive system of the hybrid vehicle is operated with the assistance of the traction motor 3 to the engine 1 such that the air-fuel ratio of the mixture is controlled to a normal or stoichiometric value (steps S43, S45, and S50).

If MOTORPOWER≦0 holds at the step S41, the program proceeds to a step S61 in FIG. 11B, wherein it is determined whether or not the temperature TD of the protective resistance of the PDU 13 is higher than a predetermined value TDF. If TD>TDF holds, there is a fear that the temperature of the drive circuit of the traction motor 3 becomes too high to execute the regeneration of electrical energy by the traction motor 3, so that all the regeneration flags are set to "0" at a step S63 to thereby inhibit the regeneration, and further the motor demanded output MOTORPOWER is set to "0" at a step S71, followed by the program proceeding to the step S53 in FIG. 11A. This makes it possible to prevent the temperature of the drive circuit of the PDU 13 from becoming excessively high.

On the other hand, if TD≦TDF holds at the step S61, it is determined at a step S62 whether or not the charge-permitting flag FCH assumes "1". If FCH=0 holds, which means that charging or recharging of the storage battery 14 is not permitted, the program proceeds to the step S63 to thereby inhibit the regeneration. This makes it possible to prevent excessive charging of the storage battery 14, heat loss of the PDU 13 due to excessive charging of the storage battery 14, and other inconveniences.

If FCH=1 holds at the step S62, which means that the charging of the storage battery 14 is permitted, it is determined at a step S72 whether any of the regeneration flags FCRUREG, FIDLEREG, and FDREG assumes "1". If any of these flags assumes "1", the program skips to a step S64, whereas if all the regeneration flags assume "0", the cumulative charge value BATTCHG is set to "0" at the step S73, and then the program proceeds to the step S64.

At the step S64, it is determined whether or not a deceleration flag FDEC, which, when set to "1", indicates that deceleration of the engine 1 is being demanded (see steps S144 to S146 in FIG. 16), assumes "1". If FDEC=1 holds, a decelerating regeneration process is carried out at a step S65 (by executing a subroutine shown in FIG. 12), and then the program proceeds to the step S53.

If FDEC=0 holds, which means that deceleration of the engine 1 is not being demanded, it is determined at a step S66 whether or not an idling flag FIDLE, which, when set to "1", indicates that the engine 1 is idling (see steps S151 to S155 in FIG. 16), assumes "1". If FIDLE=0 holds, which means that the engine is not idling, a cruising regeneration process is carried out at a step S67, and then the program proceeds to the step S53.

In the cruising regeneration process, the cruising regeneration flag FCRUREG is set to "1", and then a cruising regeneration amount map, not shown, is retrieved according to the engine rotational speed NE and the extra output EXPOWER, to thereby determine a cruising regeneration amount CRUREG. Then, the motor demanded output MOTORPOWER is set to the thus determined cruising regeneration amount CRUREG.

If FIDLE=1 holds at the step S66, it is determined at a step S68 whether or not a rotation fluctuation flag FDNE, which, when set to "1", indicates that the rotational speed of the engine 1 largely fluctuates, assumes "1". If FDNE=1 holds, the torque fluctuation-reducing process is carried out at the step S70, whereas if FDNE=0 holds, an idling regeneration process is carried out at a step S69, and then the program proceeds to the step S53.

In the torque fluctuation-reducing process, the value of the motor demanded output MOTORPOWER is determined so as to reduce the fluctuations in the engine rotational speed. In the idling regeneration process, the idling regeneration flag FIDLEREG is set to "1", and an idling regeneration amount IDLEREG is determined according to the depth of discharge DOD of the storage battery 14. Then, the motor demanded output MOTORPOWER is set to the thus determined idling regeneration amount IDLEREG.

As described above, according to the motor output-determining process of FIGS. 11A and 11B, the traction motor 3 is selectively set to one of an assisting mode in which the traction motor 3 assists the engine 1 (by the steps S44 to S50, and S53), a regenerative mode in which the regeneration of electrical energy is executed (by the steps S65, S67, and S69), and a zero output mode in which the traction motor 3 generates no output (by the steps S52 and S71), based on the motor demanded output MOTORPOWER determined in the FIG. 8 process, and in dependence on the states of the assistance-permitting flag FASSIST and the charge-permitting flag FCH both set in dependence on the amount of remaining charge in the storage battery 14. This makes it possible to control the traction motor 3 such that it performs the assistance of the engine 1 and regeneration of electrical energy in a suitable manner, whereby the fuel economy and torque-generating performance of the drive system of the hybrid vehicle can be improved while preserving a sufficient amount of remaining charge in the storage battery 14.

Figure 12:
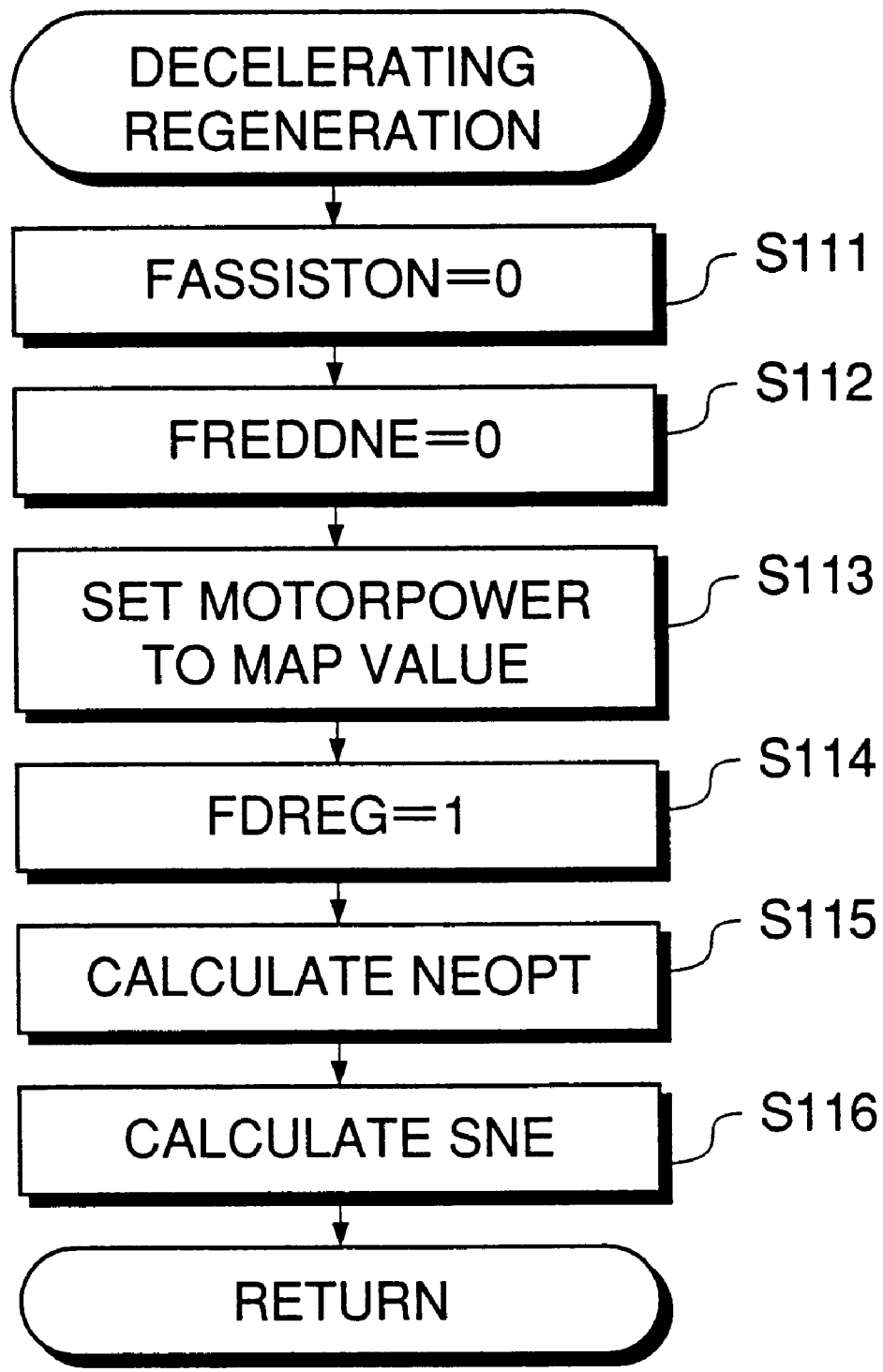
FIG. 12 is a flowchart showing a subroutine for carrying out a decelerating regeneration process, which is executed at a step S16 in FIG. 11B.

FIG. 12 shows a subroutine for carrying out the decelerating regeneration process which is executed at the step S65 in FIG. 11B.

First, the assistance-executing flag FASSISTON is set to "0" at a step S111, and the fluctuation-reducing flag FREDDNE is set to "0" at a step S112. Then, the motor demanded output MOTORPOWER determined at the step S35 in FIG. 8 is employed as it is at a step S113. That is, during deceleration, the area where EXPOWER<0 holds in the MOTORPOWER map of FIG. 10 is retrieved, and the obtained value MOTORPOWER is employed as it is.

Now, description will be made of a manner of setting map values of the MOTORPOWER map with reference to FIG. 14A and 14B (area where EXPOWER<0 holds). In the figures, the solid lines each indicate a regeneration output limit REGLMT(NE) of the traction motor 3, and the broken lines an amount of energy BRKPOWER(NE) lost by engine braking. (NE) of these parameters indicates that these parameters are functions of the engine rotational speed NE. The regeneration output limit REGLMT(NE) is determined based on the specification of the traction motor 3 such that it increases in proportion to the engine rotational speed NE in a region where the engine rotational speed NE is lower than a predetermined value NE0, while it assumes a fixed value in a region where the NE value is equal to or higher than the predetermined value NE0. The energy BRKPOWER(NE) lost by engine braking increases as the engine rotational speed NE increases.

If a lattice point in the map is represented by (NE, EXPOWER), a map value at a lattice point (NE1, EXPOWER11) is set to MOTORPOWER=EXPOWER11−BRKPOWER(NE1), and a map value at a lattice point (NE1, EXPOWER1) is set to MOTORPOWER=EXPOWER1−BRKPOWER(NE1)=REGLMT(NE1)−BRKPOWER(NE1). In an area where NE=NE1 and EXPOWER>EXPOWER1 hold, a map value in this area is set to MOTORPOWER=REGLMT(NE1)−BRKPOWER(NE1).

A map value at a lattice point (NE2, EXPOWER21) is set to MOTORPOWER=EXPOWER21−BRKPOWER(NE2). In an area where NE=NE2 and EXPOWER>EXPOWER0 hold, a map value in this area is set to MOTORPOWER=REGLMT(NE2)−BRKPOWER(NE2)=EXPOWER0−BRKPOWER(NE2).

Figure 14A:
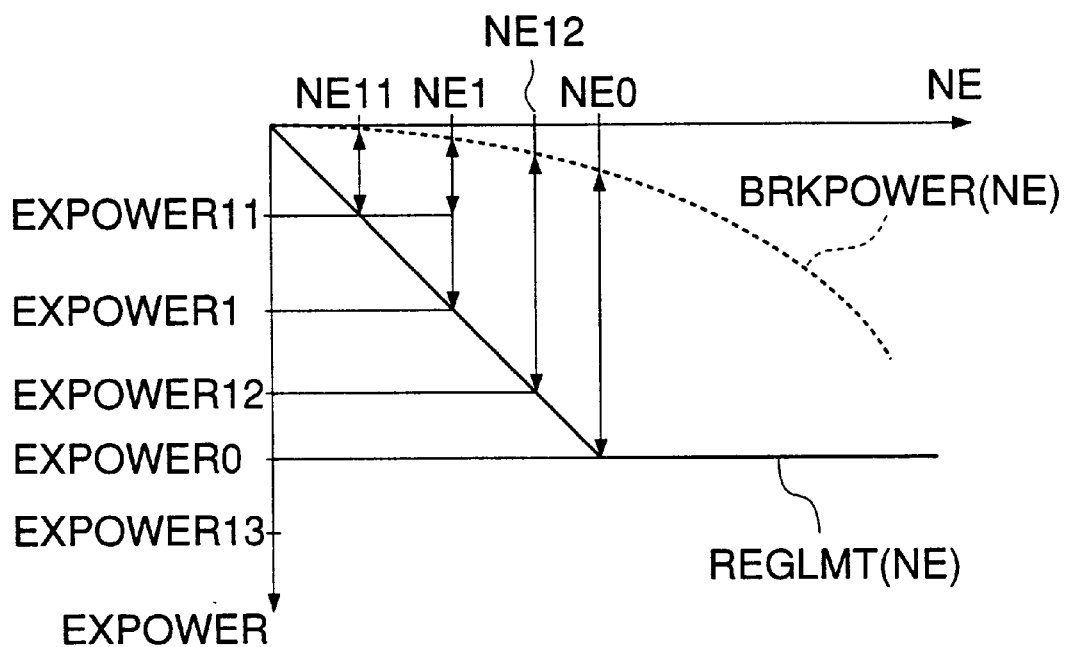
FIG. 14A is a graph useful in explaining a manner of setting an optimal rotational speed of the traction motor.
Figure 14B:
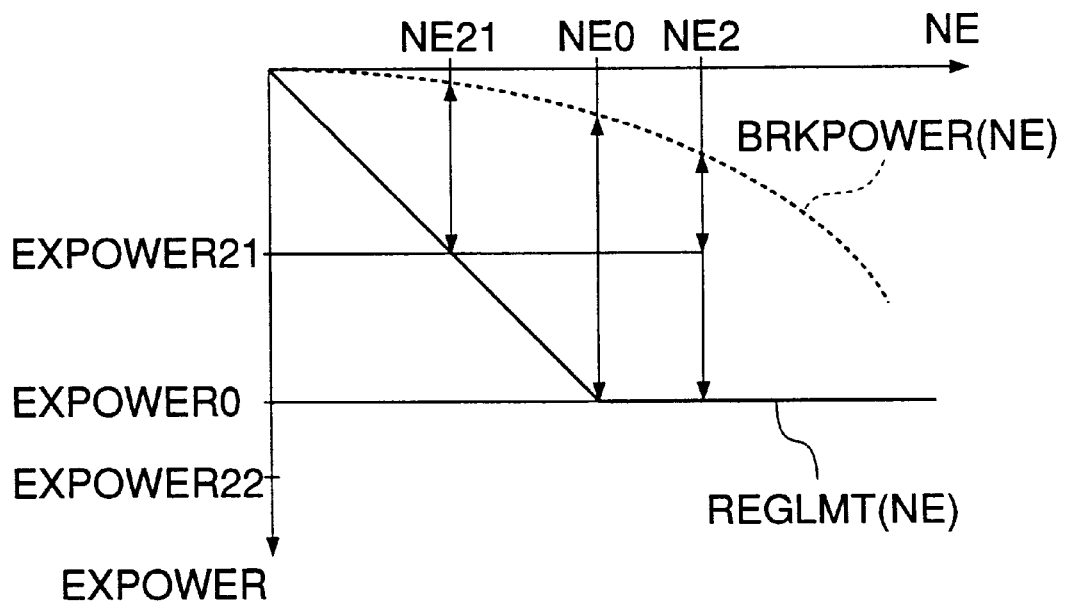
FIG. 14B also is a graph useful in explaining a manner of setting the optimal rotational speed of the traction motor.

Next, the decelerating regeneration flag FDREG is set to "1" at a step S114, and at the following step S115, an optimal rotational speed NEOPT is calculated in the following manner:

1) In FIGS. 14A and 14B, if the present operating condition of the engine corresponds to the lattice point (NE1, EXPOWER1), EXPOWER1=REGLMT(NE1) holds, and therefore NEOPT is set to NE1.

2) If the present operating condition of the engine corresponds to the lattice point (NE1, EXPOWER11), the regeneration output becomes the maximum if NE=NE11, and therefore NEOPT is set to NE11.

3) If the present operating condition of the engine corresponds to a lattice point (NE1, EXPOWER12), the regeneration output becomes the maximum if NE=NE12, and therefand therefore NEOPT is set to NE12.

4) If the present operating condition of the engine corresponds to a lattice point (NE1, EXPOWER13), the regeneration output becomes the maximum if NE=NE0, and therefore NEOPT is set to NE0.

5) If the present operating condition of the engine corresponds to the lattice point (NE2, EXPOWER21), the regeneration output becomes the maximum if NE=NE21, and therefore NEOPT is set to NE21.

6) If the present operating condition of the engine corresponds to a lattice point (NE1, EXPOWER22), the regeneration output becomes the maximum if NE=NE0, and therefore NEOPT is set to NE0.

Next, a difference SNE (=NEOPT−NE) between a present value of the engine rotational speed NE and the optimal rotational speed NEOPT is calculated at a step S116, followed by terminating the present routine.

As described hereinabove, the MOTECU 12 controls the PDU 13, based on the motor output OUTPUTPOWER calculated by the process of FIGS. 11A and 11B, to thereby control the operation modes (assisting mode, regeneration mode, zero-output mode) of the traction motor 3.

Figure 13:
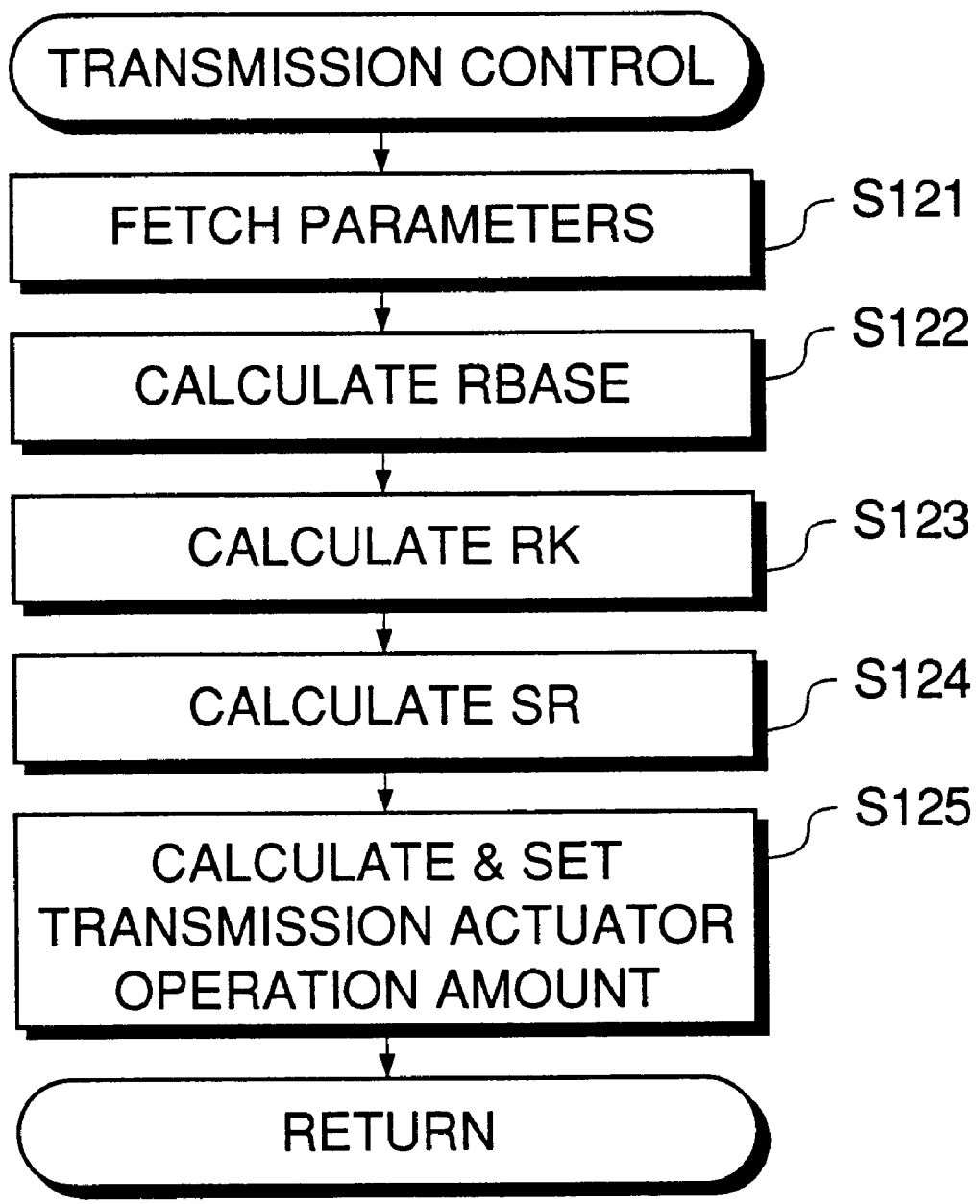
FIG. 13 is a flowchart showing a routine for carrying out a transmission control process.

FIG. 13 shows a program for controlling the transmission 4, which is executed by the T/MECU 16, e.g. at predetermined time intervals.

First, at a step 121, various detected operating parameters, such as the accelerator opening θAP and the vehicle speed VCAR, are fetched, and a basic value RBASE of the change gear ratio is calculated based on the accelerator opening θAP and the vehicle speed VCAR at a step S122. At the next step S123, a desired change gear ratio RK is calculated based on the rotational speed difference SNE calculated at the step S118 in FIG. 12, the detected driven shaft rotational speed NM (or the vehicle speed VCAR), and the basic change gear ratio RBASE. The desired change gear ratio RK is calculated such that the rotational speed difference SNE becomes equal to 0. If the rotational speed difference SNE is too large to set SNE=0 even by changing the change gear ratio, the RK value is set to such a value that the SNE value becomes the minimum insofar as it can be controlled by changing the change gear ratio. Further, if the decelerating regeneration process is not carried out, the rotational speed difference SNE is set to "0".

Next, a difference SR (=RK−GR) between the desired change gear ratio RK and the detected change gear ratio RG is calculated at a step S124, and an operating amount of the transmission actuator is calculated according to the change gear ratio difference SR. Then, the thus calculated operating amount of the transmission actuator 303 is set in an output register at a step S125, followed by terminating the present routine.

As described above, when the decelerating regeneration is carried out according to the FIGS. 12 and 13 processes, the optimal rotational speed (the rotational speed of the engine= the rotational speed of the motor) NEOPT, at which the regeneration output of the traction motor 3 becomes the maximum, is calculated, and the change gear ratio of the transmission 4 is controlled such that the motor rotational speed becomes equal to the calculated optimal rotational speed NEOPT, whereby kinetic energy generated during deceleration of the vehicle can be efficiently collected as electrical energy. Further, since the optimal rotational speed NEOPT is calculated based on the motor regeneration output limit REGLMT, excessive heating of the traction motor and an extra change in the change gear ratio can be avoided.

The motor demanded output MOTORPOWER applied during decelerating regeneration is determined according to the detected engine rotational speed NE and the extra output EXPOWER. Therefore, even when the actual engine rotational speed NE does not become equal to the optimal rotational speed NEOPT, the MOTORPOWER value is set to a value suitable for the actual engine rotational speed NE.

Figure 15:
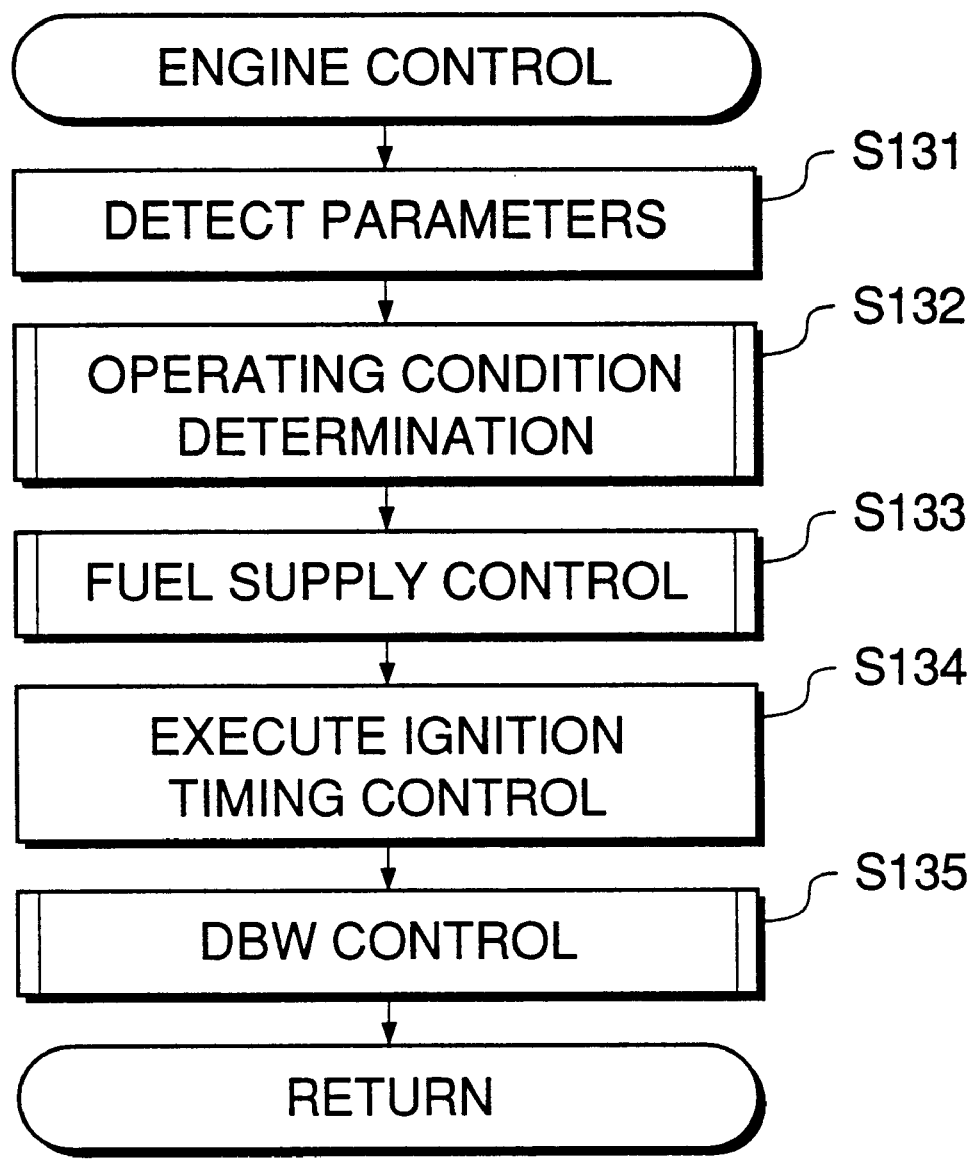
FIG. 15 is a flowchart showing a routine for carrying out an overall engine control process.

Next, engine control executed by the ENGECU 11 will be described hereinbelow. FIG. 15 shows a program for overall engine control, which is executed, e.g. at predetermined time intervals.

First, various engine operating parameters, such as the engine rotational speed NE and the intake pipe absolute pressure PBA are detected at a step S131, and then operating condition-determining processing at a step S132, a fuel supply control process at a step S133, an ignition timing control process at a step S134, and a DBW control process (throttle valve opening control process via the throttle actuator 105) at a step S135 are sequentially executed.

Figure 16:
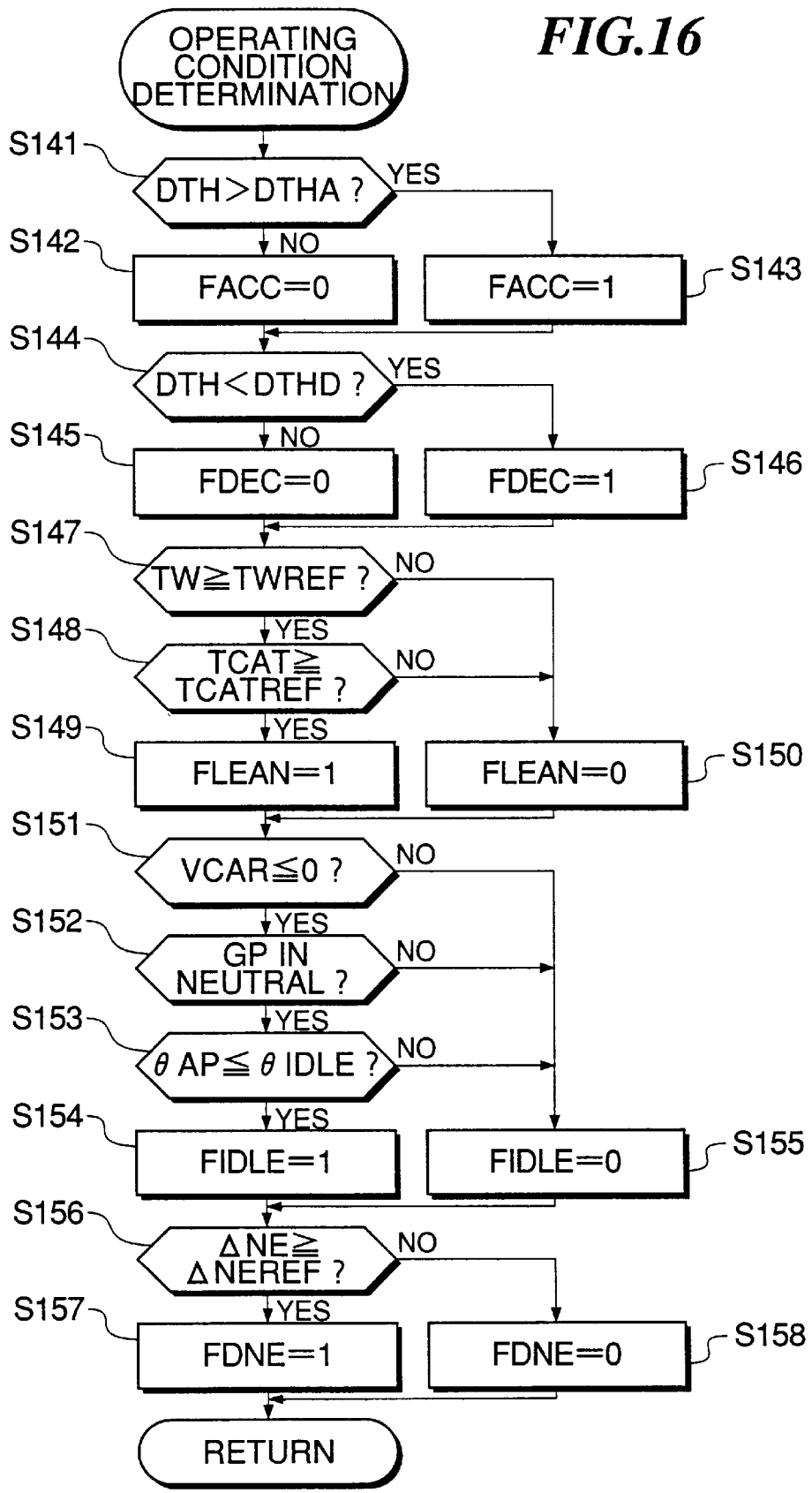
FIG. 16 is a flowchart showing a subroutine for carrying out an engine operating condition-determining process, which is executed at a step S132 in FIG. 15.

FIG. 16 shows a subroutine for carrying out the operating condition-determining process at the step S132 in FIG. 15.

At a step S141, it is determined whether or not the amount of change DTH in the detected throttle valve opening θTH (present θTH value−immediately preceding θTH value) is larger than a predetermined positive value DTHA. If DTH>DTHA holds, an acceleration flag FACC is set to "1" at a step S143, whereas if DTH≦DTHA holds, the acceleration flag is set to "0" at a step S142, and then the program proceeds to a step S144.

At the step S144, it is determined whether or not the amount of change DTH in the throttle valve opening θTH is smaller than a predetermined negative value DTHD. If DTH<DTHD holds, the deceleration flag FDEC is set to "1" at a step S146, whereas if DTH≧DTHA holds, the deceleration flag is set to "0" at a step S145, and then the program proceeds to a step S147.

At the step S147, it is determined whether or not the engine coolant temperature TW is equal to or higher than a predetermined value TWREF. If TW≧TWREF holds, it is further determined at a step S148 whether or not the catalyst temperature TCAT is equal to or higher than a predetermined reference value TCATREF. If TW<TWREF holds at the step S147, or if TCAT<TCATREF holds at the step S148, a leaning flag FLEAN is set to "0" at a step 8150 to inhibit leaning operation of the engine 1. On the other hand, if TW≧TWREF holds at the step S147 and at the same time TCAT≧TCATREF holds at the step S148, the leaning flag FLEAN is set to "1" at a step S149 to permit the leaning operation of the engine 1.

At the following step S151, it is determined whether or not the vehicle speed VCAR is equal to or lower than 0. If VCAR≦0 holds, which means that the vehicle is in stoppage, it is determined at a step S152 whether or not the transmission 4 is in the neutral position. If the transmission 4 is in the neutral position, it is determined at a step S153 whether or not the accelerator opening θAP is equal to or smaller than a predetermined idling value θIDLE. If all the answers to the questions of the steps S151 to S153 are affirmative (YES), it is judged that the engine is idling, so that the idling flag FIDLE is set to "1" at a step S154, whereas if any of the answers to the questions of the steps S151 to S153 is negative (NO), it is judged that engine is not idling, so that the idling flag FIDLE is set to "0" at a step S155, and then the program proceeds to a step S156.

At the step S156, it is determined whether or not the amount of change ΔNE in the engine rotational speed NE (ΔNE=present NE value−immediately preceding NE value) is equal to or larger than a predetermined value ΔNEREF. If ΔNE≧ΔNEREF holds, the rotation fluctuation flag FDNE is set to "1" at a step S157, whereas if ΔNE<ΔNEREF holds, the rotation fluctuation flag is set to "0" at a step S158, followed by terminating the program.

In the fuel supply control process executed at the step S133 in FIG. 15, if the deceleration flag FDEC=1 holds, fuel supply to the engine is interrupted. On the other hand, if FDEC=0 holds, a valve opening time over which the fuel injection valve 106 is opened and a valve opening timing of the same are calculated according to engine operating conditions, such as the engine rotational speed NE and the intake pipe absolute pressure PBA, and the fuel supply control is executed based on the calculated values.

In the ignition timing control executed at the step S134, the ignition timing is calculated according to engine operating conditions, such as the engine rotational speed NE and the intake pipe absolute pressure PBA, and the ignition timing control is executed based on the calculated values.

In the DBW control executed at the step S135, a desired value of the throttle valve opening θTH is calculated according to the accelerator opening θAP, the engine rotational speed NE, etc., and the throttle valve opening θTH is controlled to the calculated desired value.

The invention is not limited to the embodiment described above, but it may be implemented by various modifications and variations thereof. For example, as electrical energy-storing means, a capacitor having a large electrostatic capacity may be used in combination with or in place of the storage battery 14.

Further, the invention may be applied to an engine which uses, in place of the throttle valve 103 of a so-called DBW type, a throttle valve of an ordinary type which is mechanically linked to the accelerator pedal.

Still further, although in the present embodiment, if FCH=0 holds, i.e. if recharging of the storage battery is not permitted, or if the temperature TD of the protective resistance of the PDU 13 is higher than the predetermined value TDF, the regeneration of electrical energy is inhibited (amount of regeneration=0) (steps S61, S52, S63 and S71 in FIG. 12), this is not limitative. Alternatively, the amount of regeneration may be set to a very small value.

Even further, the transmission 4 may be replaced by an automatic transmission which is capable of changing the change gear ratio in a stepwise manner. In such a case, the gear position is controlled such that the motor rotational speed assumes a value closest to the optimal rotational speed NEOPT so far as the actual rotational speed does not exceeds the rotational speed NEO in FIG. 14.

What is claimed is:

1. A control system for a hybrid vehicle including driving wheels, an internal combustion engine, a drive shaft driven by said engine, a traction motor for driving said drive shaft by electrical energy and having a regenerative function of converting kinetic energy of said drive shaft into electrical energy, a transmission arranged between said driving wheels of said vehicle and said engine and said traction motor, and electrical storage means for supplying electrical energy to said traction motor and for storing electrical energy output from said traction motor, the control system comprising:

desired output-calculating means for calculating a desired regeneration output from said traction motor according to decelerating conditions of said vehicle;

optimal rotational speed-calculating means for calculating an optimal rotational speed of said traction motor at which said traction motor provides a maximum regeneration output, according to said desired output calculated by said desired output-calculating means and a regeneration output limit of said traction motor; and change gear ratio control means for controlling a change gear ratio of said transmission such that a rotational speed of said traction motor is equal to said optimal rotational speed.

2. A control system as claimed in claim 1, wherein said desired output-calculating means includes: (i) engine demanded output-calculating means for calculating an output demanded by said engine based on operating conditions of said engine including a rotational speed of said engine, (ii) running resistance-calculating means for calculating a running resistance of said vehicle based on running conditions of said vehicle, and (iii) engine extra output-calculating means for calculating an extra output of said engine based on said output demanded by said engine and said running resistance, and wherein said desired output-calculating means calculates said desired output of said traction motor based on said extra output of said engine.

3. A control system as claimed in claim 2, wherein said optimal rotational speed-calculating means calculates said regeneration output limit of said traction motor according to said rotational speed of said engine, and calculates said optimal rotational speed of said traction motor based on said desired output of said traction motor and said regeneration output limit.

4. A control system as claimed in claim 1, wherein said regeneration output limit is set so as to increase in proportion to said rotational speed of said engine in a region where said rotational speed of said engine is lower than a predetermined value, and wherein said regeneration output limit is set to a fixed value in a region where said rotational speed of said engine is equal to or higher than said predetermined value.

5. A control system as claimed in claim 3, wherein said change gear ratio control means controls said change gear ratio of said transmission in response to a difference between said rotational speed of said engine and said optimal rotational speed in a manner such that said difference is minimized.

6. A control system as claimed in claim 5, wherein said vehicle includes an accelerator pedal and said transmission includes a driven shaft, wherein said change gear ratio control means includes means for calculating a basic change gear ratio of said transmission based on a stepping-on amount of said accelerator pedal and a traveling speed of said vehicle, wherein said change gear ratio control means calculates a desired change gear ratio based on said difference between said rotational speed of said engine and said optimal rotational speed, a rotational speed of said driven shaft, and said calculated basic change gear ratio, and wherein said change gear ratio control means controls said change gear ratio to attain said calculated desired change gear ratio.

7. A control system as claimed in claim 1, further comprising remaining charge-calculating means for calculating an amount of remaining charge in said electrical storage means, and motor output-limiting meals for limiting an output from said traction motor based on said amount of remaining charge calculated by said remaining charge-calculating means.

8. A control system as claimed in claim 1, wherein said transmission is a variable speed transmission.

9. A control system as claimed in claim 4, wherein said change gear ratio control means controls said change gear ratio of said transmission in response to a difference between said rotational speed of said engine and said optimal rotational speed in a manner such that said difference is minimized.

10. A control system as claimed in claim 2, further comprising remaining charge-calculating means for calculating an amount of remaining charge in said electrical storage means, and motor output-limiting meals for limiting an output from said traction motor based on said amount of remaining charge calculated by said remaining charge-calculating means.

11. A control system as claimed in claim 3, further comprising remaining charge-calculating means for calculating an amount of remaining charge in said electrical storage means, and motor output-limiting meals for limiting an output from said traction motor based on said amount of remaining charge calculated by said remaining charge-calculating means.

12. A control system as claimed in claim 4, further comprising remaining charge-calculating means for calculating an amount of remaining charge in said electrical storage means, and motor output-limiting meals for limiting an output from said traction motor based on said amount of remaining charge calculated by said remaining charge-calculating means.

13. A control system as claimed in claim 2, wherein said transmission is a variable speed transmission.

14. A control system as claimed in claim 3, wherein said transmission is a variable speed transmission.

15. A control system as claimed in claim 4, wherein said transmission is a variable speed transmission.

* * * * *